(12) United States Patent
Youn et al.

(10) Patent No.: US 8,229,435 B2
(45) Date of Patent: Jul. 24, 2012

(54) APPARATUS AND METHOD FOR SCHEDULING IN WIRELESS COMMUNICATION SYSTEM

(75) Inventors: Il-Jin Youn, Bucheon-si (KR); Byung-Chan An, Seoul (KR); Seung-Joo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 12/660,364

(22) Filed: Feb. 25, 2010

(65) Prior Publication Data

US 2010/0216472 A1    Aug. 26, 2010

(30) Foreign Application Priority Data

Feb. 25, 2009    (KR) .................. 10-2009-0016042

(51) Int. Cl.
*H04W 36/00* (2009.01)
(52) U.S. Cl. ............ 455/436; 455/442; 455/422.1; 455/432.1; 455/435.1; 370/331

(58) Field of Classification Search .......... 455/436, 455/442, 422.1, 435.1, 432.1; 370/331
See application file for complete search history.

(56) References Cited

U.S. PATENT DOCUMENTS

| 8,000,711 B2 * | 8/2011 | Fischer et al. ................. 455/436 |
| 2009/0197603 A1 * | 8/2009 | Ji et al. .......................... 455/436 |

* cited by examiner

*Primary Examiner* — Nghi Ly (57) ABSTRACT

A base station is capable of performing a method for scheduling in a wireless communication system. In the method, a downlink channel measurement value received from a terminal is compared with a threshold. When the downlink channel measurement value is smaller than the threshold, an activation set for a handover of the terminal is determined. When the number of base stations inside the activation set is two or more, a Modulation and Coding Scheme (MCS) level is allocated to the terminal with consideration of the downlink channel measurement value. A wireless resource is allocated to the terminal with consideration of the allocated MCS level and a headroom of the terminal.

22 Claims, 5 Drawing Sheets

APPARATUS AND METHOD FOR SCHEDULING IN WIRELESS COMMUNICATION SYSTEM

PRIORITY

The present application claims the benefit under 35 U.S.C. §119(a) of a Korean patent application filed in the Korean Intellectual Property Office on Feb. 25, 2009 and assigned Serial No. 10-2009-0016042, the entire disclosure of which is hereby incorporated by reference.

TECHNICAL FIELD OF THE INVENTION

The present invention relates to an apparatus and a method for scheduling in a wireless communication system. More particularly, the present invention relates to an apparatus and a method for determining a transmission rate of a terminal using a size of an activation set for a handover in a wireless communication system.

BACKGROUND OF THE INVENTION

A $4^{th}$ generation communication system, which is the next generation communication system, is being developed to provide mobility, Quality of Service (QoS), and a high speed service to a broadband wireless access communication system. A representative example thereof is an Institute of Electrical and Electronics Engineers (IEEE) 802.16 communication system.

The IEEE 802.16 communication system uses an Orthogonal Frequency Division Multiple (OFDM)/Orthogonal Frequency Division Multiple Access (OFDMA) scheme for a physical channel. The OFDM or OFDMA scheme has a characteristic of obtaining a best transmission efficiency when transmitting high speed data by maintaining orthogonality between a plurality of subcarriers.

A handover technique of an IEEE 802.16-based broadband wireless communication system includes a hard handover and a Fast Base Station Switching (FBSS). Here, the FBSS is one of mechanisms for reducing a handover delay time, and manages not only a serving base station with which a terminal currently communicates, but also neighbor communicatable base stations as an activation set. Base stations inside the activation set share a Media Access Control (MAC) context related to a terminal, and may perform a pre-handover of making a reservation of a resource for a terminal in advance. Therefore, when a terminal performs switching (or handover) to a base station inside an activation set, latency may be reduced. Generally, a terminal may add/delete a relevant base station to/from an activation set using received signal intensity of a base station.

The broadband wireless communication system may guarantee uplink coverage and use an interference control algorithm in order to obtain a maximum capacity. That is, to guarantee the performance of a cell boundary terminal with an uplink load greater than a proper level, an uplink interference control is essential.

In the conventional uplink scheduling and interference control algorithm, a channel measurement value is reduced by other change factors such as shadowing, so that an error of determining a terminal at a short distance as a cell boundary terminal occurs. Therefore, a low Modulation and Coding Scheme (MCS) level and a small subchannel may be allocated to a terminal at a short distance. In this case, a transmission efficiency of a system is reduced.

SUMMARY OF THE INVENTION

To address the above-discussed deficiencies of the prior art, it is a primary aspect of the present invention to provide an apparatus and a method for estimating a location of a terminal, and performing uplink scheduling using the location of the terminal in a wireless communication system.

Another aspect of the present invention is to provide an apparatus and a method for estimating a location of a terminal using an activation set for a handover in a wireless communication system.

Still another aspect of the present invention is to provide an apparatus and a method for determining a transmission rate of a terminal using a channel measurement value and a size of an activation set in a wireless communication system.

Yet another aspect of the present invention is to provide an apparatus and a method for determining an MCS level of a terminal using a channel measurement value and a size of an activation set in a wireless communication system.

In accordance with an aspect of the present invention, an apparatus of a base station in a wireless communication system is provided. The apparatus includes a Modulation and Coding Scheme (MCS) level determination unit for, when a downlink channel measurement value received from a terminal is smaller than a threshold, determining an activation set for a handover of the terminal, and when the number of base stations inside the activation set is two or more, allocating an MCS level to the terminal with consideration of the downlink channel measurement value, and a wireless resource determination unit for allocating a wireless resource to the terminal with consideration of the allocated MCS level and a headroom of the terminal.

In accordance with another aspect of the present invention, a scheduling method of a base station in a wireless communication system is provided. The method includes comparing a downlink channel measurement value received from a terminal with a threshold, when the downlink channel measurement value is smaller than the threshold, determining an activation set for a handover of the terminal, when the number of base stations inside the activation set is two or more, allocating a Modulation and Coding Scheme (MCS) level to the terminal with consideration of the downlink channel measurement value, allocating a wireless resource to the terminal with consideration of the allocated MCS level and a headroom of the terminal, and when the number of base stations inside the activation set is 1 or less, allocating a specific MCS level to the terminal.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Exemplary embodiments of the present invention provide an alternative for estimating a location of a terminal inside a cell and performing uplink scheduling using the location of the terminal in a wireless communication system.

When determining that a terminal is located at a cell boundary using a downlink channel measurement value received from the terminal, a base station verifies whether the terminal is a cell boundary terminal using a size of an activation set of the terminal. When the terminal is fixed as a cell boundary terminal by the size of the activation set, the base station may determine a transmission rate using the downlink channel measurement value. In contrast, when determining that the terminal is not a cell boundary terminal using the size of the activation set, the base station may determine a transmission rate using other determination factors (for example, a specific MCS level, uplink transmission power information, and so forth) instead of the downlink channel measurement value.

Though an exemplary embodiment of the present invention is described using an OFDM/OFDMA broadband wireless communication system as an example, it is readily applicable to a wireless communication system of a different access.

Figure 1:
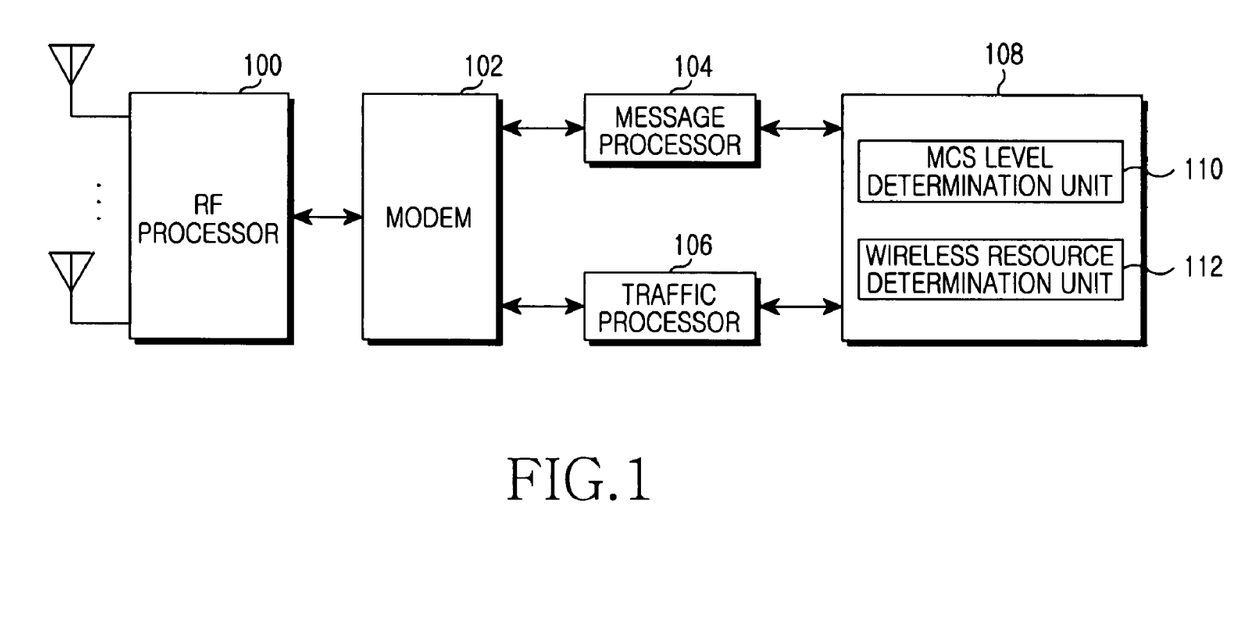
FIG. 1 illustrates a base station in a wireless communication system according to an exemplary embodiment of the present invention.

FIG. 1 illustrates a base station in a broadband wireless communication system according to an exemplary embodiment of the present invention.

Referring to FIG. 1, the base station includes a Radio Frequency (RF) processor 100, a modem 102, a message processor 104, a traffic processor 106, and a scheduler 108. Here, the scheduler 108 may include an MCS level determination unit 110 and a wireless resource determination unit 112.

The RF processor 100 converts an RF signal received via at least one antenna into a baseband signal, and converts the baseband signal into digital sample data to provide the same to the modem 102. In addition, the RF processor 100 converts baseband sample data from the modem 102 into a baseband analog signal, and converts the baseband analog signal into an RF signal to transmit the same via the at least one antenna.

The modem 102 demodulates a signal from the RF processor in a physical layer to recover information data (reception packet), when the information data is a signaling message, provides the signaling message to the message processor 104, and when the information data is traffic data, provides the traffic data to the traffic processor 106. Here, in the case of the OFDM/OFDMA system, the modem 102 may convert sample data from the RF processor 100 into data in a frequency domain by performing OFDM demodulation (Fast Fourier Transform (FFT)), and channel-demodulate and channel-decode data in the frequency domain to recover original information data. In addition, the modem 102 modulates a transmission packet (transmission message) from the message processor 104 and the traffic processor 106 in the physical layer to provide the same to the RF processor 100. In the case of the OFDM/OFDMA system, the modem 102 converts a transmission packet into sample data in a time domain by channel-coding and channel-modulating the transmission packet, and performs OFDM modulation (Inverse Fast Fourier Transform (IFFT)) on the channel-modulated data.

In addition, the modem 102 may demodulate a channel signal (for example, a Channel Quality Indicator (CQI) channel) received from a terminal to obtain downlink Carrier to Interference and Noise Ratio (CINR) information, and provide the obtained downlink CINR information to the scheduler 108.

For receiving a message, the message processor 104 protocol-processes a reception signaling message (control message or MAC management message) from the modem 102. For transmitting a message, the message processor 104 generates a transmission signaling message and provides the same to the modem 102. The message processor 104 extracts transmission power information of a terminal from a burst received from the terminal and provides the same to the scheduler 108.

For receiving traffic, the traffic processor 106 protocol-processes reception traffic from the modem 102. For transmitting traffic, the traffic processor 106 protocol-processes transmission traffic and provides the same to the modem 102.

The scheduler 108 determines scheduling priority of service flows, and allocates an MCS level and a wireless resource (for example, a slot) for each service flow (or terminal) according to the determined priority. When resource allocation to terminals (service flows) to which a service is to be provided is completed, the scheduler 108 provides scheduling results (resource allocation results) to the message processor 104. Then, the message processor 104 generates a resource allocation message (for example, a MAP message) using the scheduling results and provides the same to the modem 102.

The MCS level determination unit 110 inside the scheduler 108 determines an MCS level for each service flow (or terminal) according to scheduling priority. At this point, the MCS level determination unit 110 may determine the MCS level using a transmission power margin for a relevant terminal, uplink transmission power information and DownLink (DL) CINR received from a terminal, and a size of an activation set for a handover of a relevant terminal.

For example, the MCS level determination unit 110 may allocate an MCS level corresponding to a received DL CINR value to a terminal. At this point, when determining that a relevant terminal is located at a cell boundary based on the received DL CINR value, the MCS level determination unit 110 determines whether a size of an activation set of a relevant terminal is greater than '1'. That is, the MCS level determination unit 110 determines whether the number of base stations inside the activation set is two or more. When the number of the base stations inside the activation set is two or more, the MCS level determination unit 110 finally determines that the terminal is located at a cell boundary, and may allocate an MCS level corresponding to the DL CINR received from the terminal. In contrast, when the number of the base stations inside the activation set is '1' or less, the MCS level determination unit 110 determines channel status deterioration caused by shadowing, and so forth, and may allocate a specific predetermined MCS level.

The wireless resource determination unit 112 determines a wireless resource to be serviced at the MCS level using the transmission power margin, the uplink transmission power information, and so forth. For example, the wireless resource determination unit 112 determines an available data size corresponding to a relevant uplink MCS level. In addition, the wireless resource determination unit 112 allocates a wireless resource (for example, a slot) to a terminal using available transmission headroom of the terminal and the available data size.

Figure 5:
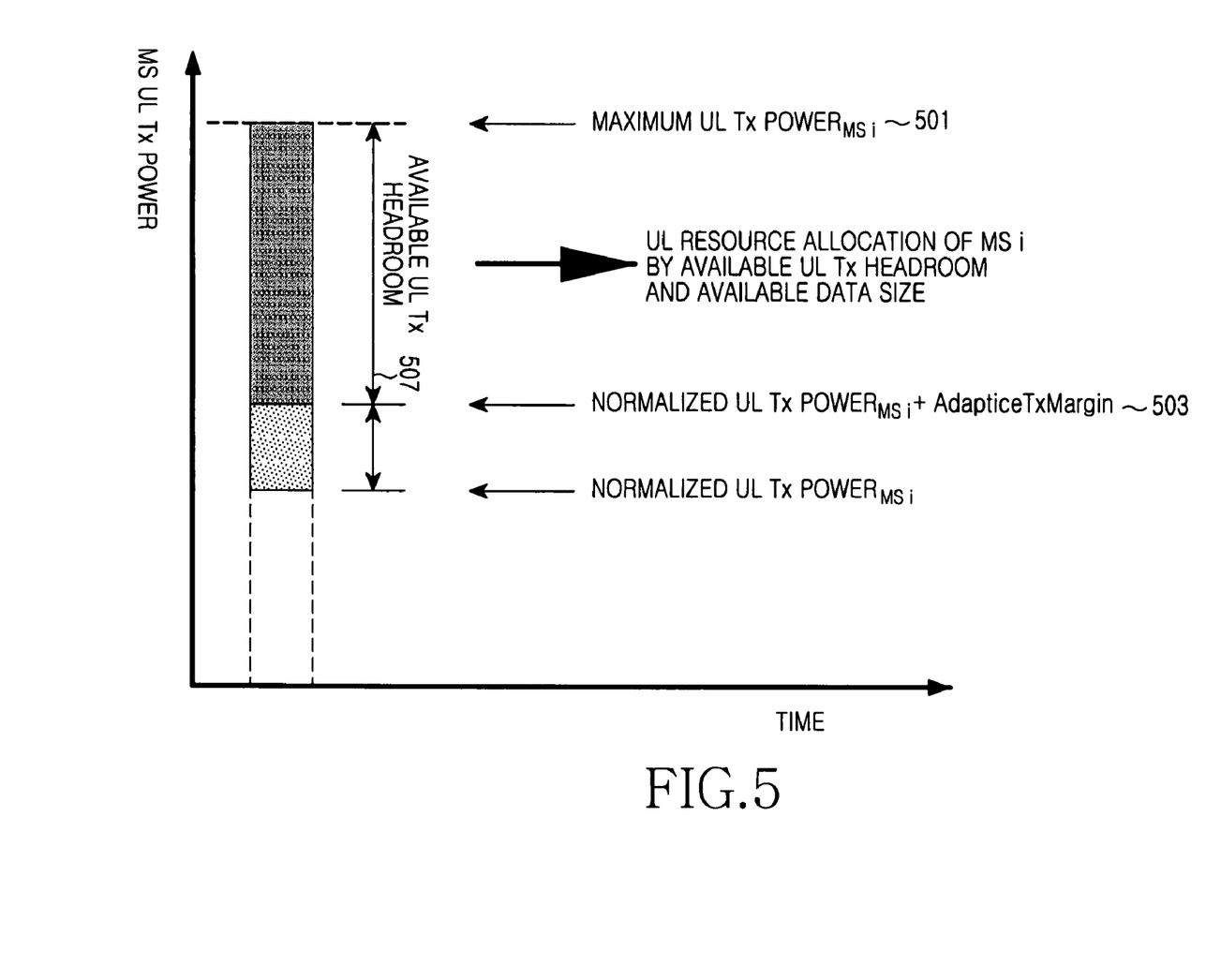
FIG. 5 illustrates a process for allocating a wireless resource using an available uplink headroom of a terminal according to an exemplary embodiment of the present invention.

For example, referring to FIG. 5, the wireless resource determination unit 112 can calculate an uplink transmission headroom 507 that is usable by a relevant terminal by subtracting a normalized uplink transmission power 503 to which a transmission power margin has been applied from maximum uplink transmission power 501 that is usable by the relevant terminal. In addition, the wireless resource determination unit 112 can determine the number of slots to be allocated to a terminal based on the calculated uplink transmission headroom 507.

An MCS level and a wireless resource (location and size) for each service flow determined as described above are provided to the message processor 104. The message processor 104 generates and transmits a resource allocation message (a MAP message) based on information provided from the scheduler 108.

Figure 2:
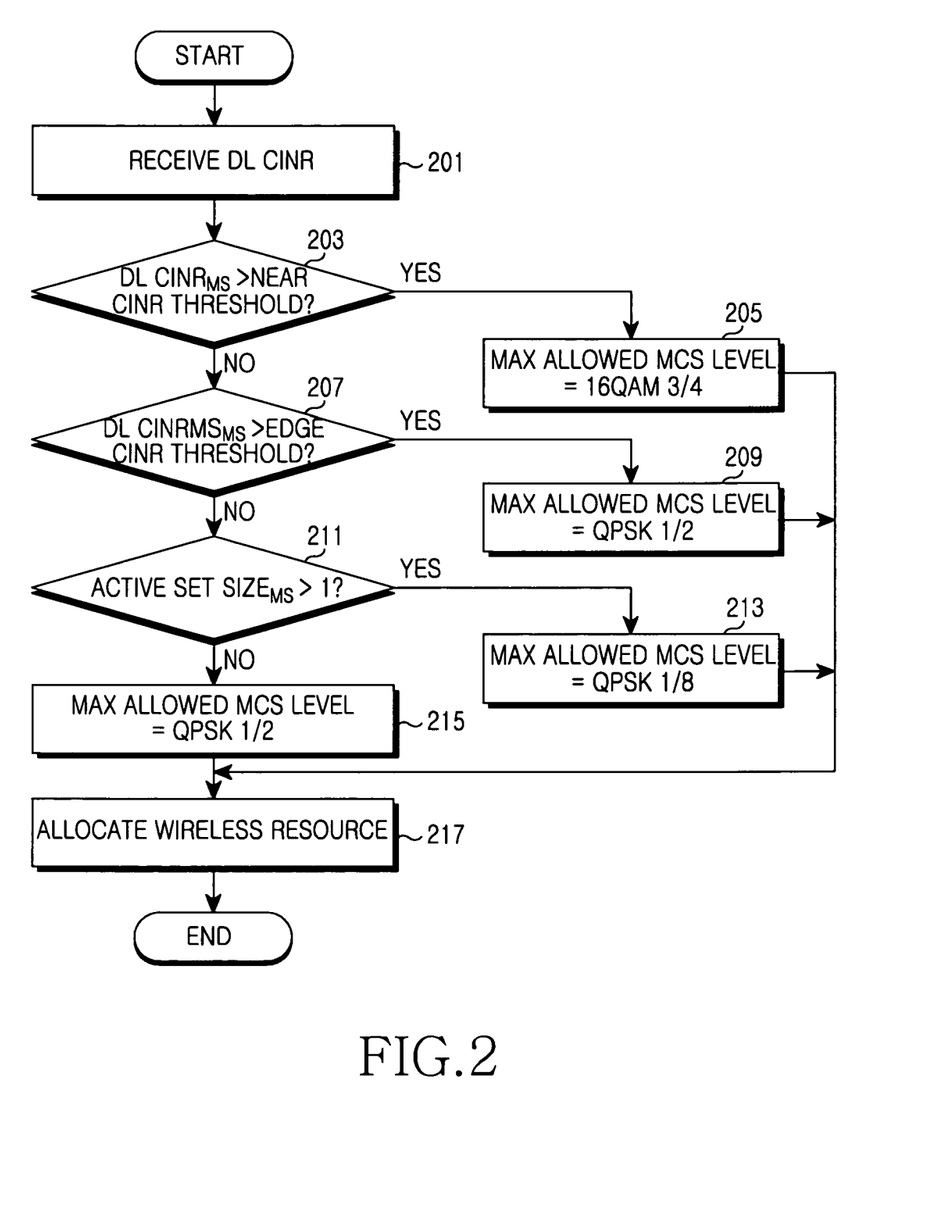
FIG. 2 illustrates an uplink scheduling procedure of a base station in a wireless communication system according to an exemplary embodiment of the present invention.

FIG. 2 illustrates an uplink scheduling procedure of a base station in a wireless communication system according to an exemplary embodiment of the present invention.

Referring to FIG. 2, the base station receives a downlink channel measurement value (for example, DL CINR) from a terminal in step 201. When scheduling, the base station determines whether the downlink channel measurement value is greater than a short distance reference value in step 203. When the downlink channel measurement value is greater than the short distance reference value, the base station determines a maximum allowed MCS level for the terminal as a first MCS level (for example, 16 Quadrature Amplitude Modulation (QAM) ¾) in step 205.

When the downlink channel measurement value is smaller than the short distance reference value, the base station determines whether the downlink channel measurement value is greater than a cell boundary reference value in step 207. When the downlink channel measurement value is greater than the cell boundary reference value, the base station determines a maximum allowed MCS level for the terminal as a second MCS level (for example, Quadrature Phase Shift Keying (QPSK) ½) in step 209.

In contrast, when the downlink channel measurement value is smaller than the cell boundary reference value, the base station determines whether a size of an activation set of the terminal is greater than '1' in step 211. That is, the base station determines whether the number of base stations inside the activation set is two or more. Here, when the number of base stations inside the activation set is two or more, the base station can determine that a relevant terminal is located at a cell boundary.

When the size of activation set exceeds 1, the base station determines a maximum allowed MCS level for the terminal as a third MCS level (for example, QPSK ⅛) in step 213. In contrast, when the size of the activation set is '1' or less, the base station determines a maximum allowed MCS level for the terminal as a specific MCS level (for example, QPSK ½) in step 215. That is, when the size of the activation set is '1' or less, the base station determines that a channel status of the terminal has deteriorated temporarily due to shadowing, and so forth and may allocate a predetermined specific MCS level.

After determining an MCS level as described above, the base station allocates a wireless resource (subchannel or slot) to the terminal with consideration of the MCS level allocated to the terminal and a headroom of the terminal in step 217.

Figure 3:
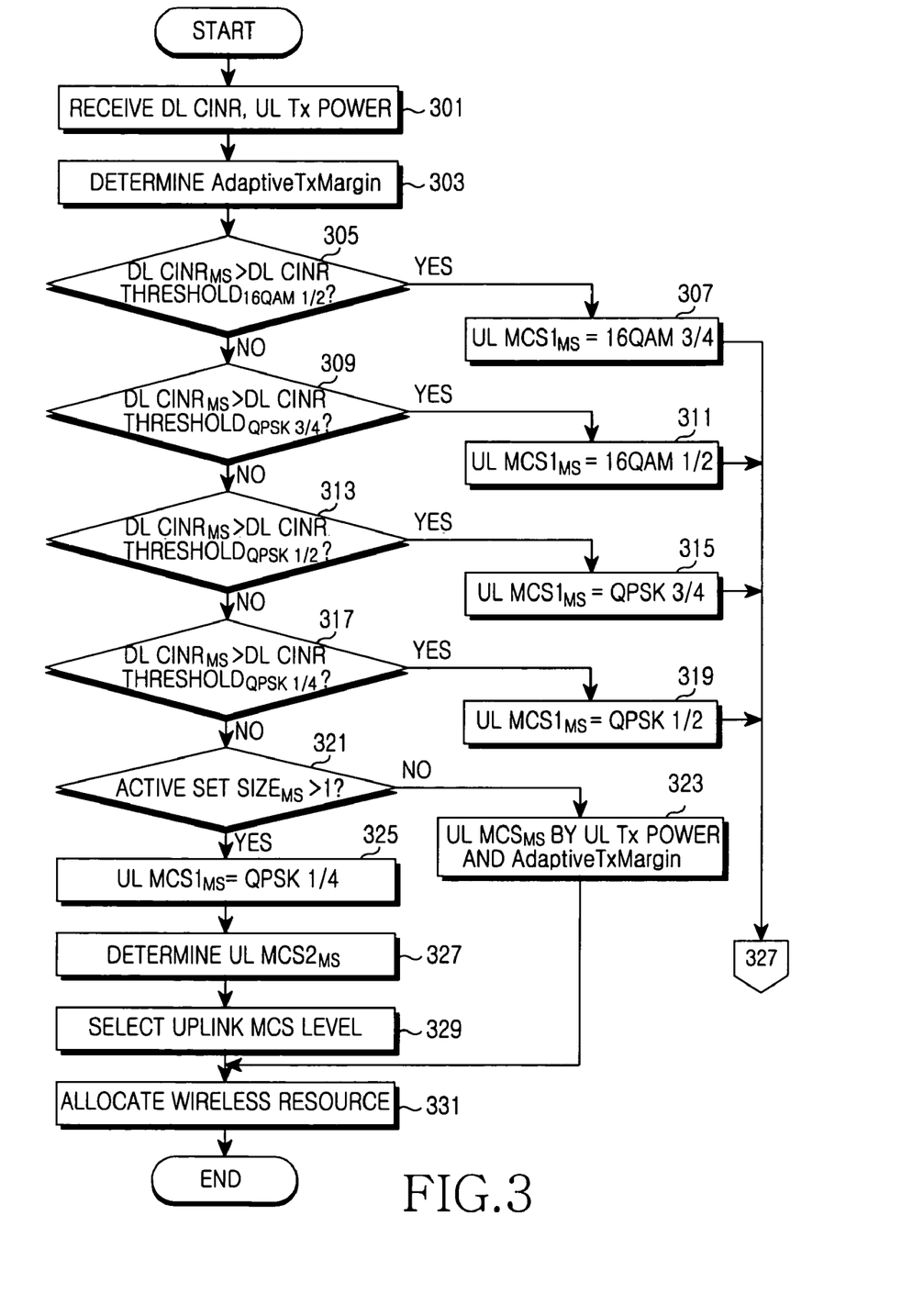
FIG. 3 illustrates an uplink scheduling procedure of a base station in a wireless communication system according to an exemplary embodiment of the present invention.
Figure 4:
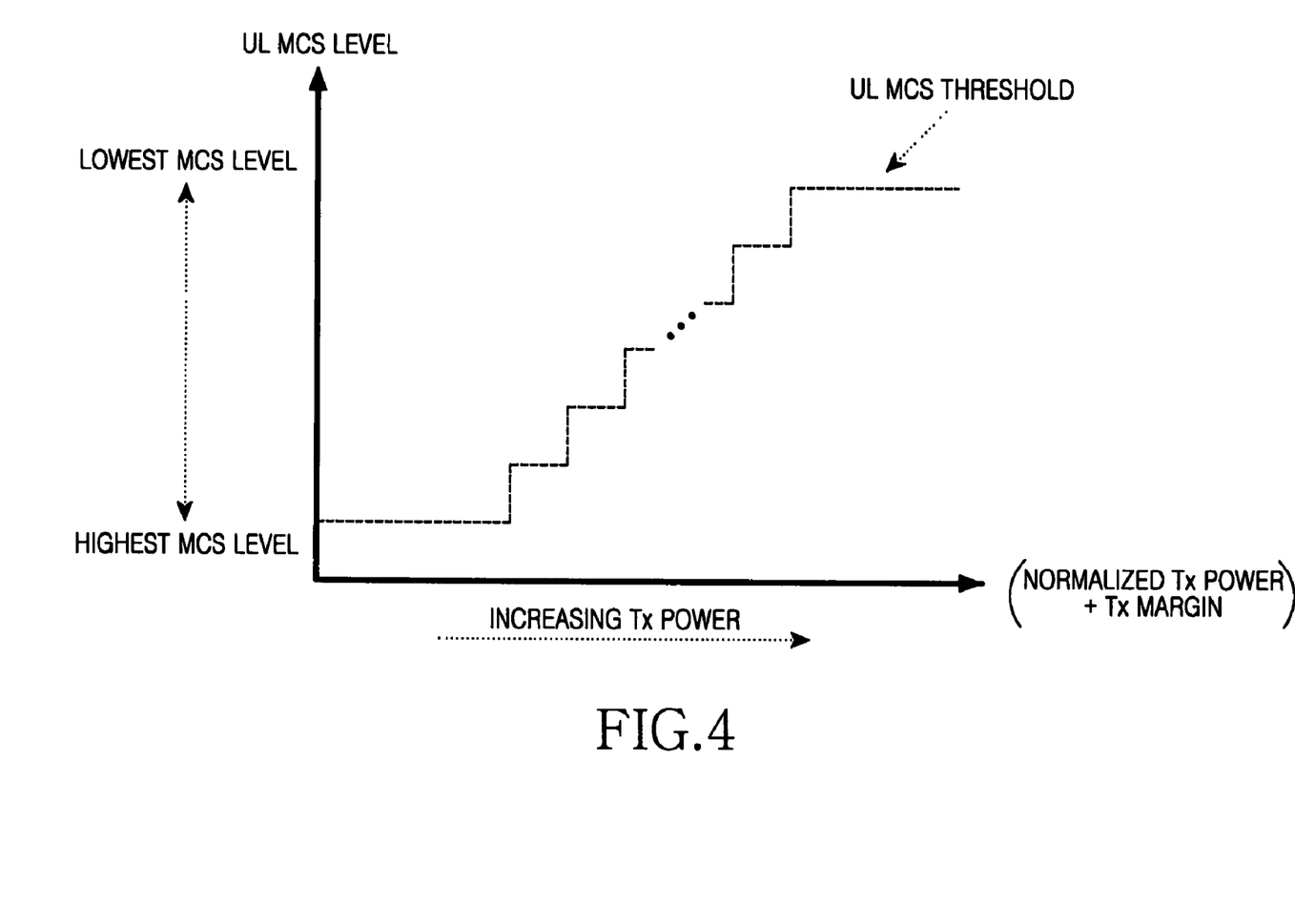
FIG. 4 illustrates a method for determining an MCS level depending on transmission power of a terminal according to an exemplary embodiment of the present invention.

FIG. 3 illustrates an uplink scheduling procedure of a base station in a wireless communication system according to an exemplary embodiment of the present invention.

Referring to FIG. 3, the base station receives a downlink channel measurement value (for example, DL CINR) and uplink transmission power information from a terminal in step 301. The downlink channel measurement value and the uplink transmission power information may be received in different methods and received in different frames.

The base station predicts an interference (for example, RoT) that may be given to an external sector (or external base station) and compares the interference predicted value (RoT prediction value) with a reference value to determine an adaptive transmission power margin in step 303. For example, when the interference prediction value is greater than the reference value, the base station increases the adaptive transmission power margin by a set value. In contrast, when the interference prediction value is smaller than the reference value, the base station may reduce the adaptive transmission power margin by a set value. At this point, the adaptive transmission power margin may be determined such that the adaptive transmission power margin does not exceed a set maximum value and a set minimum value. It is assumed that the interference prediction is performed using a known algorithm.

In addition, the base station determines whether a downlink channel measurement value received from the terminal is greater than a first reference (for example, DL CINR threshold$_{16QAM, 1/2}$) in step 305. When the downlink channel measurement value is greater than the first reference, the base station determines a first MCS (UL MCS1$_{MS}$) of the terminal as a first level (for example, 16 QAM, ¾) in step 307, and proceeds to step 327.

In contrast, when the downlink channel measurement value is smaller than the first reference, the base station compares the downlink channel measurement value with a second reference (for example, DL CINR Threshold$_{QPSK, 3/4}$) in step

309. At this point, when the downlink channel measurement value is greater than the second reference, the base station determines the first MCS of the terminal as a second level (for example, 16 QAM, ½) in step 311, and proceeds to step 327.

In contrast, when the downlink channel measurement value is smaller than the second reference, the base station compares the downlink channel measurement value with a third reference (for example, DL CINR threshold$_{QPSK\ 1/2}$) in step 313. At this point, when the downlink channel measurement value is greater than the third reference, the base station determines the first MCS of the terminal as a third level (for example, QPSK, ¾) in step 315, and proceeds to step 327.

In contrast, when the downlink channel measurement value is smaller than the third reference, the base station compares the downlink measurement value with a fourth reference (for example, DL CINR Threshold$_{QPSK\ 1/4}$) in step 317. At this point, when the downlink channel measurement value is greater than the fourth reference, the base station determines the first MCS of the terminal as a fourth level (for example, QPSK, ½) in step 319, and proceeds to step 327.

In contrast, when the downlink channel measurement value is smaller than the fourth reference, the base station determines whether a size of an activation set of the terminal is greater than '1' in step 324. That is, the base station determines whether the number of base stations inside the activation set is two or more. Here, when the number of the base stations inside the activation set is two or more, the base station may determine that a relevant terminal is located at a cell boundary.

When the size of the activation set exceeds '1,' the base station determines the first MCS of the terminal as a fifth level (for example, QPSK, ¼) in step 325, and proceeds to step 327.

The base station determines a second MCS (UL MCS2$_{MS}$) of the terminal using the determined adaptive transmission power margin in step 327. For example, referring to FIG. 4, the base station normalizes uplink transmission power received from a terminal using a specific uplink MCS level (for example, QPSK, ½) and a specific wireless resource (one slot), adds the adaptive transmission power margin to the normalized transmission power, and compares the added value with a predetermined reference value (UL MCS threshold 1) to determine an MCS level (UL MCS2$_{MS}$).

As described above, when the first MCS corresponding to the downlink channel measurement value (DL CINR) and the second MCS corresponding to the uplink transmission power are determined, the base station selects a smaller one from the first MCS and the second MCS, and allocates the selected MCS level to the terminal in step 329, and proceeds to step 331.

In contrast, when the size of the activation set is '1' or less in step 321, the base station determines an MCS level using the uplink transmission and the adaptive transmission power margin, and allocates the determined MCS level to the terminal in step 323, and proceeds to step 331. That is, when the size of the activation set is '1' or less, the base station determines that a channel status of the terminal has been deteriorated temporarily due to shadowing, and so forth and allocates an MCS level using uplink transmission power of the terminal instead of a downlink channel measurement value of the terminal.

As described above, when the uplink MCS level of the terminal is determined, the base station allocates a wireless resource (for example, a slot) to the terminal using an available transmission headroom of the terminal and an available data size corresponding to the MCS level in step 331. For example, referring to FIG. 5, the base station calculates an uplink transmission headroom 507 that is usable by the terminal by subtracting a normalized uplink transmission power 503 to which an adaptive transmission margin AdaptiveTx-Margin has been applied from maximum uplink transmission power 501 that is usable by the terminal. In addition, the base station may allocate a wireless resource for the available data size while the calculated uplink transmission headroom 507 is not insufficient.

As described above, although an MCS level is divided into five stages (16 QAM ¾, 16 QAM ½, QPSK ¾, QPSK ½, QPSK ¼) and allocation is performed according to an exemplary embodiment of the present invention, stages of the MCS level may change variously depending on system requirements.

In addition, a technique for determining a cell boundary terminal using a size of an activation set according to an exemplary embodiment of the present invention may be easily used for other control algorithms such as effective RoT estimation algorithm, etc. as well as scheduling.

As described above, since an exemplary embodiment of the present invention estimates a location of a terminal using a size of an activation set and performs uplink scheduling with consideration of the location of the terminal, an efficient transmission rate, that is, an MCS level and a wireless resource may be allocated to a terminal. That is, an exemplary embodiment of the present invention increases a system transmission efficiency by allocating an efficient transmission rate and a wireless resource to a terminal.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus of a base station in a wireless communication system, the apparatus comprising:
    a Modulation and Coding Scheme (MCS) level determination unit configured to:
    when a downlink channel measurement value received from a terminal is smaller than a threshold, determine an activation set for a handover of the terminal, and
    when the number of base stations inside the activation set is two or more, allocate an MCS level to the terminal with consideration of the downlink channel measurement value; and
    a wireless resource determination unit configured to allocate a wireless resource to the terminal with consideration of the allocated MCS level and a headroom of the terminal.

2. The apparatus of claim 1, wherein when the number of the base stations inside the activation set is 1 or less, the MCS level determination unit allocates a specific MCS level to the terminal.

3. The apparatus of claim 1, further comprising:
    a first receiver configured to receive the downlink channel measurement value from the terminal;
    a second receiver configured to receive an uplink transmission power value from the terminal;
    an interference predictor configured to predict an interference given to an external sector; and
    a margin determination unit configured to determine an adaptive transmission power margin by comparing an interference prediction value from the interference predictor with a reference value.

4. The apparatus of claim 3, wherein when the number of the base stations inside the activation set is 1 or less, the MCS level determination unit is configured to determine an MCS level using the uplink transmission power value and the adaptive transmission power margin, and allocate the determined MCS level to the terminal.

5. The apparatus of claim 3, wherein when at least one of: the downlink channel measurement value is greater than the threshold; and the number of the base stations inside the activation set is two or more, the MCS level determination unit comprises:
a first determination unit configured to determine a first MCS for the terminal according to the downlink channel measurement value received from the terminal;
a second determination unit configured to determine a second MCS for the terminal using the uplink transmission power value and the adaptive transmission power margin; and
a third determination unit configured to allocate a smaller MCS of the first MCS and the second MCS to the terminal.

6. The apparatus of claim 5, wherein the second determination unit is configured to:
normalize the uplink transmission power value on a specific unit basis;
add the adaptive transmission power margin to the normalized transmission power value; and
determine the second MCS by comparing the added value with a reference.

7. The apparatus of claim 1, wherein the downlink channel measurement value comprises a DownLink (DL) Carrier to Interference and Noise Ratio (CINR).

8. A scheduling method of a base station in a wireless communication system, the method comprising:
comparing a downlink channel measurement value received from a terminal with a threshold;
when the downlink channel measurement value is smaller than the threshold, determining an activation set for a handover of the terminal;
when the number of base stations inside the activation set is two or more, allocating a Modulation and Coding Scheme (MCS) level to the terminal with consideration of the downlink channel measurement value; and
allocating a wireless resource to the terminal with consideration of the allocated MCS level and a headroom of the terminal.

9. The method of claim 8, further comprising, when the number of the base stations inside the activation set is 1 or less, allocating a specific MCS level to the terminal.

10. The method of claim 8, further comprising:
receiving the downlink channel measurement value from the terminal;
receiving an uplink transmission power value from the terminal;
predicting an interference given to an external sector; and
determining an adaptive transmission power margin by comparing the interference prediction value with a reference.

11. The method of claim 10, further comprising, when the number of the base stations inside the activation set is 1 or less, determining an MCS level using the uplink transmission power value and the adaptive transmission power margin, and allocating the determined MCS level to the terminal.

12. The method of claim 10, further comprising:
when the downlink channel measurement value is greater than the threshold, determining a first MCS for the terminal according to the downlink channel measurement value received from the terminal;
determining a second MCS for the terminal using the uplink transmission power value and the adaptive transmission power margin; and
allocating a smaller MCS of the first MCS and the second MCS to the terminal.

13. The method of claim 10, wherein the allocating of the MCS level comprises:
determining a first MCS for the terminal according to the downlink channel measurement value received from the terminal;
determining a second MCS for the terminal using the uplink transmission power value and the adaptive transmission power margin; and
allocating a smaller MCS of the first MCS and the second MCS to the terminal.

14. The method of claim 13, wherein the determining of the second MCS comprises:
normalizing the uplink transmission power value on a specific unit basis;
adding the adaptive transmission power margin to the normalized transmission power value; and
determining the second MCS by comparing the added value with a reference.

15. The method of claim 8, wherein the downlink channel measurement value comprises a DownLink (DL) Carrier to Interference and Noise Ratio (CINR).

16. A base station for use in a wireless communication system, the base station comprising:
an RF processor;
a modem; and
a scheduler, the scheduler comprising:
a Modulation and Coding Scheme (MCS) level determination unit configured to:
when a downlink channel measurement value received from a terminal is smaller than a threshold, determine an activation set for a handover of the terminal, and
when the number of base stations inside the activation set is two or more, allocate an MCS level to the terminal with consideration of the downlink channel measurement value; and
a wireless resource determination unit configured to allocate a wireless resource to the terminal with consideration of the allocated MCS level and a headroom of the terminal.

17. The base station of claim 16, wherein when the number of the base stations inside the activation set is 1 or less, the MCS level determination unit allocates a specific MCS level to the terminal.

18. The base station of claim 16, further comprising:
a first receiver configured to receive the downlink channel measurement value from the terminal;
a second receiver configured to receive an uplink transmission power value from the terminal;
an interference predictor configured to predict an interference given to an external sector; and
a margin determination unit configured to determine an adaptive transmission power margin by comparing an interference prediction value from the interference predictor with a reference value.

19. The base station of claim 18, wherein when the number of the base stations inside the activation set is 1 or less, the MCS level determination unit is configured to determine an MCS level using the uplink transmission power value and the adaptive transmission power margin, and allocate the determined MCS level to the terminal.

20. The base station of claim 18, wherein when at least one of: the downlink channel measurement value is greater than the threshold; and the number of the base stations inside the activation set is two or more, the MCS level determination unit comprises:
- a first determination unit configured to determine a first MCS for the terminal according to the downlink channel measurement value received from the terminal;
- a second determination unit configured to determine a second MCS for the terminal using the uplink transmission power value and the adaptive transmission power margin; and
- a third determination unit configured to allocate a smaller MCS of the first MCS and the second MCS to the terminal.

21. The base station of claim 20, wherein the second determination unit is configured to:
- normalize the uplink transmission power value on a specific unit basis;
- add the adaptive transmission power margin to the normalized transmission power value; and
- determine the second MCS by comparing the added value with a reference.

22. The base station of claim 16, wherein the downlink channel measurement value comprises a DownLink (DL) Carrier to Interference and Noise Ratio (CINR).

* * * * *